US005603285A

United States Patent [19]
Kleinsasser

[11] Patent Number: 5,603,285
[45] Date of Patent: Feb. 18, 1997

[54] ADJUSTABLE SHELF FEEDER FOR ANIMALS TO ACCOMMODATE GROWTH

[75] Inventor: Jonathan Kleinsasser, Ste. Agathe, Canada

[73] Assignee: Crystal Spring Colony Farms Ltd., Ste. Agethe

[21] Appl. No.: 488,663

[22] Filed: Jun. 8, 1995

Related U.S. Application Data

[63] Continuation-in-part of Ser. No. 379,306, Jan. 27, 1995.
[51] Int. Cl.⁶ .................................................. A01K 7/06
[52] U.S. Cl. .................................................. 119/53
[58] Field of Search .............................. 119/53, 53.5, 57, 119/54

[56] References Cited

U.S. PATENT DOCUMENTS

| | | | |
|---|---|---|---|
| 3,233,590 | 2/1966 | Venca | 119/53 |
| 4,147,132 | 4/1979 | Gilst | 119/53 |
| 4,444,151 | 4/1984 | Bohlmann | 119/53.3 |
| 4,660,508 | 4/1987 | Kleinsasser et al. | |
| 4,911,727 | 3/1990 | King | 119/53 |
| 5,010,849 | 4/1991 | Kleinsasser | 119/53 |

FOREIGN PATENT DOCUMENTS

| | | |
|---|---|---|
| 0464343 | 1/1992 | European Pat. Off. |
| 9209328 | 9/1992 | Germany. |
| 8908388 | 9/1989 | WIPO. |

Primary Examiner—Todd E. Manahan
Attorney, Agent, or Firm—Adrian D. Battison; Murray E. Thrift

[57] ABSTRACT

An adjustable feeder includes a first arrangement which acts as a dry feeder and provides two vertical slides (31) each on a respective side of a hopper (22) which is simultaneously vertically adjustable by straps (41) at the ends of the hopper. In a second arrangement the same adjustment system is used with a shelf type feeder so that the shelf (60) can be adjusted between a lower position for small animals and a raised position for large animals and the slides (31) can move vertically to accommodate the change in height of the shelf (60) and to adjust the distance of the slides (31) from the shelf (60) to control the feed flow.

19 Claims, 8 Drawing Sheets

ADJUSTABLE SHELF FEEDER FOR ANIMALS TO ACCOMMODATE GROWTH

This application is a continuation-in-part application of application Ser. No. 08/379306 filed Jan. 27th 1995 which is presently pending.

BACKGROUND OF THE INVENTION

This invention relates to a feeder for animals, of the type for feeding dry feed in particulate form, which includes a substantially horizontal shelf beneath a hopper so that the feed from the hopper is discharged onto the shelf and the amount of feed discharged is controlled by adjustment of the height of a lowermost edge of the hopper relative to the shelf. The shelf is located above a trough with a base and a front wall of the trough over which the animal can reach to take feed from the shelf and any feed which is moved from the shelf to the trough by the animal.

An example of a feeder of this type is shown in U.S. Pat. No. 4,660,508 of the present inventor and this type of feeder has become very successful and is widely known as a wet/dry feeder in view of the fact that the animal can take dry feed from the shelf of the feeder or can apply water into feed discharged into the trough to take the feed in the trough in wet condition.

It is also known to supply feed wholly in dry form in what is known as a dry feeder. The arrangement for discharging the feed from the hopper is somewhat similar in that there is provided a lowermost edge of the hopper which is positioned relative to the base of the hopper at a distance which can be adjusted so as to control the amount of feed which falls from the hopper onto the horizontal surface defined by the base or defined by a raised portion of the base.

Feeders of this type can either be double sided that is the feeder has two sides each of which can be accessed by a different set of animals so that generally the feeder is placed in a fence line to supply feed to animals in two separate pens. Other types of feeders are however single sided so that they have generally a vertical rear wall with the trough presented forwardly of that rear wall and the animals accessing the feeder only from the trough side of the rear wall.

SUMMARY OF THE INVENTION

It is an object of the present invention, to provide an improved feeder of the type including a shelf raised above a trough which can be used to accommodate animals over a longer growth period, thus accommodating the animals when they are relatively small and also when they are of significantly increased size.

According to one aspect of the invention there is provided a feeder for feeding animals while the animals grow from a first small size to a second larger size comprising:

a trough having a base and a side wall over which the animals can reach for taking feed from the trough;

a shelf mounted above the base of the trough and arranged at a height such that the animals can take feed from the shelf while reaching over the side wall and such that feed falling from the shelf is collected in the trough;

a feed hopper positioned above the shelf for depositing feed onto the shelf, the hopper having a lowermost edge arranged at a distance from the shelf for controlling an amount of feed discharged from the hopper onto the shelf and for maintaining the feed discharged on the shelf unless moved from the shelf by the animal;

and adjustment means for raising and lowering the shelf whereby the height of the shelf from the base of the trough can be adjusted to at least two different heights including a first lower height to accommodate said animals at the first small size and including a second higher height to accommodate said animals at the second larger size;

said adjustment means including means for adjusting said distance for each of said two different heights.

According to a second aspect of the invention there is provided a method of feeding animals while the animals grow from a first small size to a second larger size comprising:

providing a trough having a base and a side wall over which the animals can reach for taking feed from the trough;

providing a shelf mounted above the base of the trough and arranged at a height such that the animals can take feed from the shelf while reaching over the side wall and such that feed falling from the shelf is collected in the trough;

providing a feed hopper positioned above the shelf for depositing feed onto the shelf, the hopper having a lowermost edge arranged at a distance from the shelf for controlling an amount of feed discharged from the hopper onto the shelf and for maintaining the feed discharged on the shelf unless moved from the shelf by the animal;

providing first adjustment means for raising and lowering the shelf whereby the height of the shelf from the base of the trough can be adjusted to at least two different heights including a first low height to accommodate said animals at the first small size and including a second higher height to accommodate said animals at the second larger size;

adjusting the height of the shelf to said first low height and at said low height defining said distance to cause said feed to be supplied to the shelf so as to cause the animals at the first small size eating the feed to grow;

and, when the animals have grown to a predetermined size, adjusting the height of the shelf to the second higher height and at said second higher height defining said distance to cause said feed to be supplied to the shelf.

While it is generally known in feeders of this type that some adjustment is necessary between the shelf height and the lowermost edge to accommodate different flow rates of feed and that this adjustment can be provided by either movement of the lowermost edge or of the shelf, none of the prior art arrangements provide sufficient amount of movement, which should be of the order of 1.5 to 2.0 inches, to provide for an effective adjustment to accommodate the animals of different age and therefore weight.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figures 1, 4:
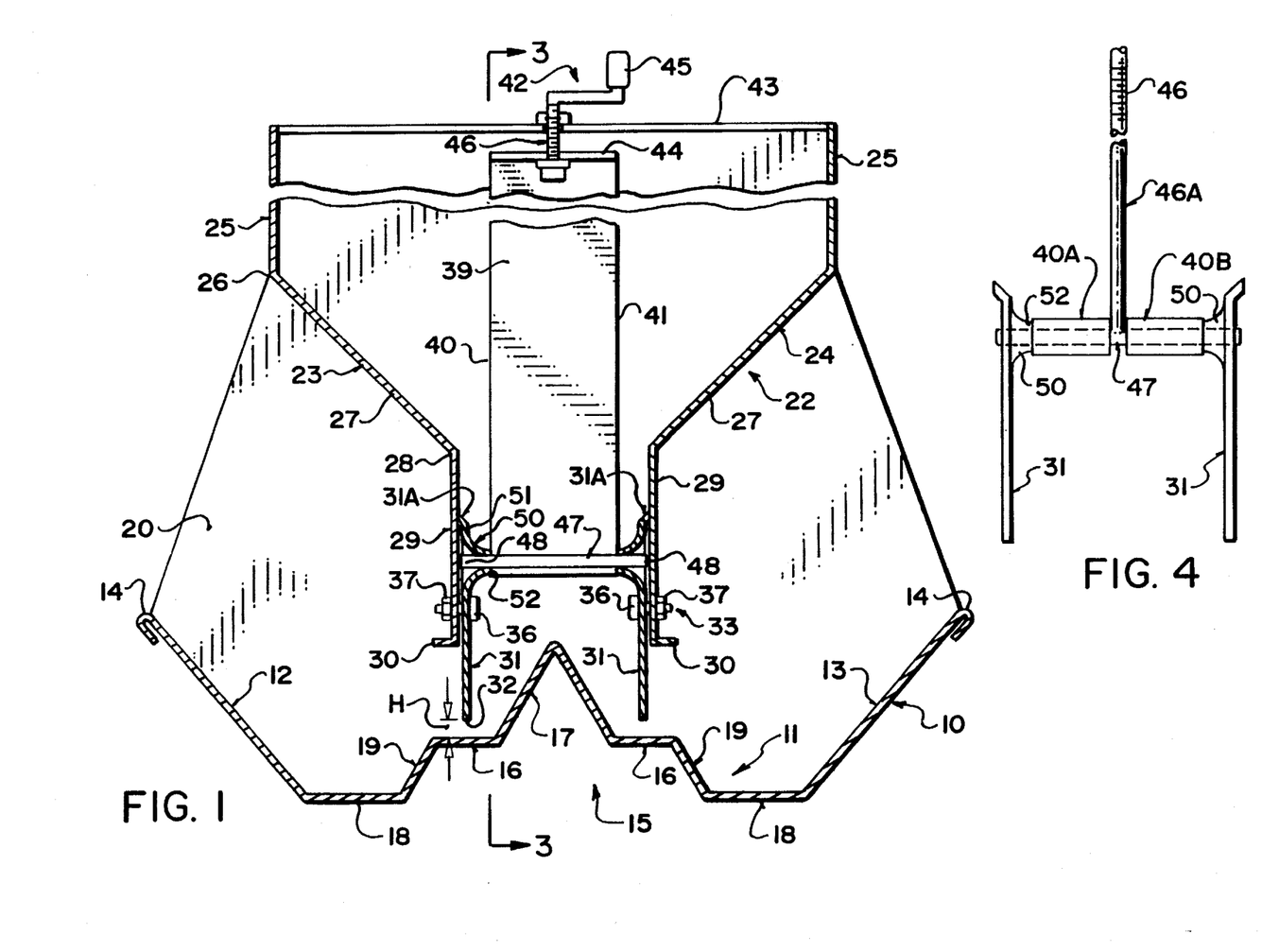
FIG. 1 is a transverse vertical cross section through a first embodiment of feeder which is related to the present invention but does not include the adjustable shelf.
FIG. 4 is a cross sectional view similar to that of FIG. 1 showing the lift member and adjustment portions only of a modified embodiment.
Figure 2:
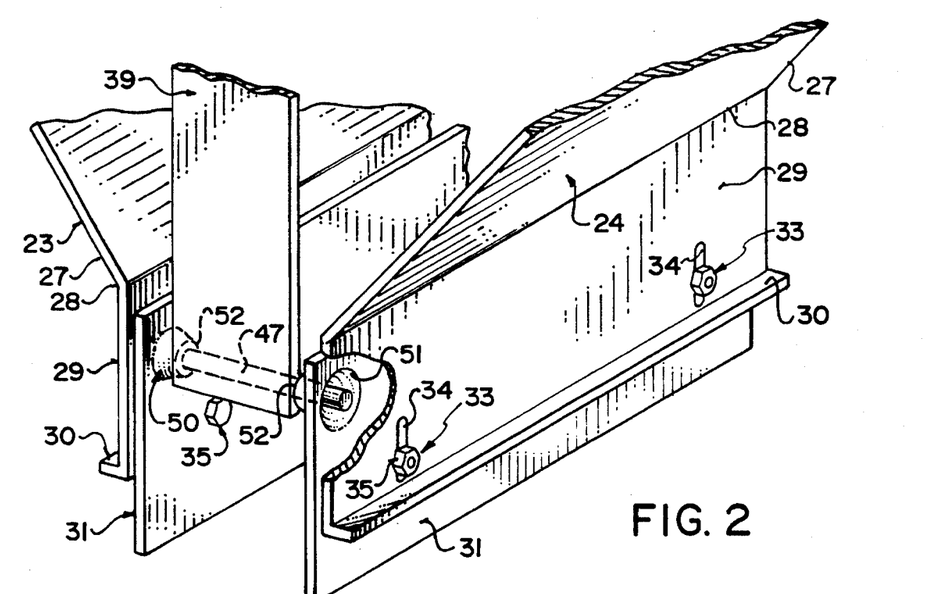
FIG. 2 is an isometric view showing the hopper of FIG. 1 with the trough and end wall removed for convenience of illustration.
Figure 3:
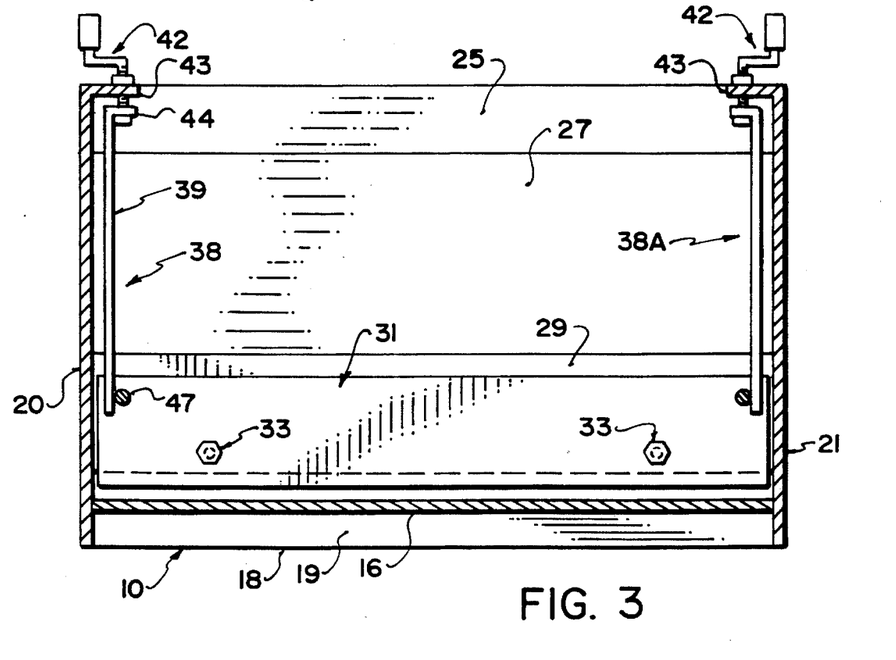
FIG. 3 is a cross sectional view along the lines 3—3 of FIG. 1 on a reduced scale for convenience of illustration.

Turning firstly to the embodiment in FIGS. 1, 2 and 3, the feeder comprises a trough 10 formed by a generally channel shaped member preferably formed from sheet metal bent to form a base 11 and two side walls 12 and 13 each arranged along a respective side of the base. The base is arranged to sit on a support floor with the side walls generally upstanding from the floor to an uppermost edge 14 of the side walls at which the side wall is folded back to avoid a raw edge adjacent the animal to feed from the trough. The base 11 includes a raised centre section 15 with two horizontal surface portions 16 and a raised central rib 17 above the horizontal surfaces 16. It will be appreciated therefore that the trough is double sided so that animals can reach over the side wall 12 to access feed at the base and also separately over the side wall 13 to access feed at the base. The trough is thus substantially symmetrical with the rib 17 along the centre of the trough. The horizontal surfaces 16 are raised from a lowermost base portion 18 by an upstanding portion 19. The raised centre section thus holds the feed discharged into the trough on the raised surfaces 16 so as to prevent any moisture present in or remaining in the base at the lowermost surface 18 from reaching the feed as it is discharged into the trough which could cause plugging of the feed at the discharge area. The raised central ribs 17 spreads the feed at the discharge position to one or other of the surfaces 16.

The ends of the trough are closed by end walls 20 which define gable ends and not only define ends of the trough but also define ends of the hopper 22. The end walls 20 and 21 are thus vertical and spaced by the length of the trough. As shown, the gable end walls can follow the shape of the trough or simply can be substantially rectangular so as to extend downwardly outside of the trough.

Above the trough is provided the hopper 22 which carries feed material to be discharged into the trough. The hopper thus includes a first side wall 23 and a second side wall 24 again symmetrical about a centre plane of the feeder. The side walls 23 and 24 each include a vertical upper section 25 defining the majority of the hopper and spaced by a width approximately equal to the width of the trough to accommodate a substantial quantity of feed. At the bottom edge 26 of the portion 25, the side walls 23 and 24 are inclined inwardly in a portion 27 which reduces the width of the hopper from the wider section at the upper part of the hopper down to a width slightly less than the width of the raised section 15 of the base. At the bottom edge 28 of each of the inclined portion 27 is defined a vertical lower portion 29 which extends vertically downwardly from the edge 28 to a lower lip 30 spaced upwardly from a respective one of the surfaces 16. The lip 30 at the bottom edge of the lower portion of the side wall is turned outwardly to provide strength at the bottom edge and to prevent bowing of the bottom edge to maintain the lower portion 29 in planar vertical shape.

Each of the side walls further includes an adjustment portion 31 in the form of a vertical plate along the full length of the side wall and positioned inside the respective lower portion 29 for sliding movement upwardly and downwardly within the lower portion 29. Each of the adjustment portions 31 thus defines a lower most edge 32 the height of which relative to the respective surface 16 can be adjusted so as to adjust the distance or space between the lower most edge on the surface 16 which controls the amount of feed discharged from the hopper to the surface 16. This distance requires to be adjusted since the distance required to deposit a predetermined amount of feed onto the surface 16 varies for different types of feed and in particular in dependence upon the repose angle of the feed material. The intention is, however, that the distance be adjusted relative to the repose angle of the feed so that the feed remains on the surface 16 without passing over the surface 19 into the base portion 18 of the trough thus maintaining supply of feed at the surface 16 without allowing to much of the feed to discharge into the trough for wastage.

The adjustment portions 31 thus form two vertical parallel plates each of which is movable vertically in a sliding action against the inside surface of the respective lower portion 29. In order to maintain the plate without bowing and to provide a tight edge of the plate against the inside of the lower portions, a top edge of the plate is bent outwardly at a few degrees into contact with the inside surface, as indicated at 31A.

The adjustment portions 31 are held in sliding action against the respective lower portion 29 by a plurality of guide elements 33 arranged at spaced positions along the length of the hopper. Each guide element 33 comprises a vertical slot 34 defined in the lower portion. Through the slot and through a hole in the adjustment portion is provided a fastener 35 in the form of a bolt 36 and a nut 37. The nut is locked in place but is not clamped tight so that the adjustment portion is pinched between the nut and the edge 31A and so that there may be a slight play allowed between the outside surface of the adjustment portion and the inside surface of the lower portion to allow a sliding action and very slight twisting or tilting movement of the adjustment portion if pushed inwardly by the animal. The adjustment portions are thus free to slide upwardly and downwardly to the extent defined by the slot 34.

Adjustment movement of the adjustment portions 31 is effected by an adjustment system including a first and a second adjustment members 38 and 38A arranged at respective ends of the hopper adjacent the gable end walls 20 and 21 respectively.

Each of the adjustment members comprises a lift member 39 in the form of a strap of sheet metal having side edges 40 and 41 with both side edges being vertical and parallel. The strap itself lies parallel to the respective gable wall. The strap is moved vertically by a screw jack system 42 connected between an upper flange 43 of the gable and an upper flange 44 of the strap. The screw includes a manually actuable handle 45 and a threaded rod 46 which operates to jack one of the flanges 43 and 44 relative to the other of the flanges in vertically upward and downward movement.

At the lower end of the strap is welded a transverse rod 47 which is horizontal and parallel to the gable wall. The rod projects outwardly beyond each side edge 40, 41 of the strap to an extent such that ends 48 of the rod are positioned just inside the inside surface of the lower portions 29 of the side walls of the hopper. The rod can thus freely slide up and down inside the upper portions 29 when jacked upwardly and downwardly by the screw jack 42.

The ends 48 of the rod 47 each project through a hole in a respective one of the adjustment portions 31. Each of the holes as best shown in FIGS. 1 and 2 is flared inwardly. Thus the material of the plate defining the adjustment portion 31 is flared to form a cone shaped portion 50 having a wide end 51 in the plane of the plate forming the different portion 31 and converging downwardly to an abutment end 52 inwardly of the plane of the plate. The abutment end 52 engages a respective one of the side edges 40 and 41 of the strap thus locating the plane of the plate slightly outwardly away from the strap and holding that plane closely adjacent the inside surface of the lower portion 29.

As an alternative arrangement the flared section 50 can be replaced by a bushing welded into the hole in the plate. The flare or bushing thus locates the vertical plane of the plate relative to the vertical side edge of the strap and prevents inward movement of the plate toward the strap.

It will be noted that the guides 33 are located at a height below the rod 47. While the guide 33 allows some twisting movement of the adjustment portion relative to the lower portion and also the cooperation between the flare 50 and the side edge of the strap also allows for some slight twisting movement, the cooperation between these elements limits the amount of twisting movement of the adjustment portion so that it is retained substantially in contact with the whole of the inside surface of the lower portion. This slight movement however particularly when the lower edge of the adjustment portion is pushed by the animal allows some movement of the lower most edge inwardly relative to the surface 16 to release feed material should it become blocked due to the poor flow characteristics of the feed material.

In FIG. 4 is shown a modified arrangement in which the strap 39 is replaced by a rod 46A which is in effect an extension of the rod 46. The transverse rod 47 is welded to the lower end of the rod 46A. In view of the fact that there is now a significant space between the edge 52 of the flared portion 50 and the side edges of the rod 46A, a pair of spacer sleeves 40A and 40B are engaged over the shaft 47 at either side of the rod 46A and the inside abutment edges 52 of the flared portions 50.

The arrangement defined above including the adjustment portions 31 and their sliding action relative to the lower portions 29 together with the two separate adjustment members 38 provides an effective adjustment system which is very simple to manufacture and in addition provides a convenient adjustment system by simple cranking of the screw jacks 42 which are readily available to the user. If it necessary therefore to adjust the distance H to accommodate changes in feed material, this can simply be effected rapidly and conveniently by actuating the screw jacks 42.

The arrangement is shown in the dry feeder of FIG. 1 in which the surface 16 is provided adjacent the base of the trough. The same arrangement can be used in a feeder in which the surfaces 16 are provided as a raised height and such a feeder may also supply water into the trough to provide a wet/dry feeder action.

Figure 5:
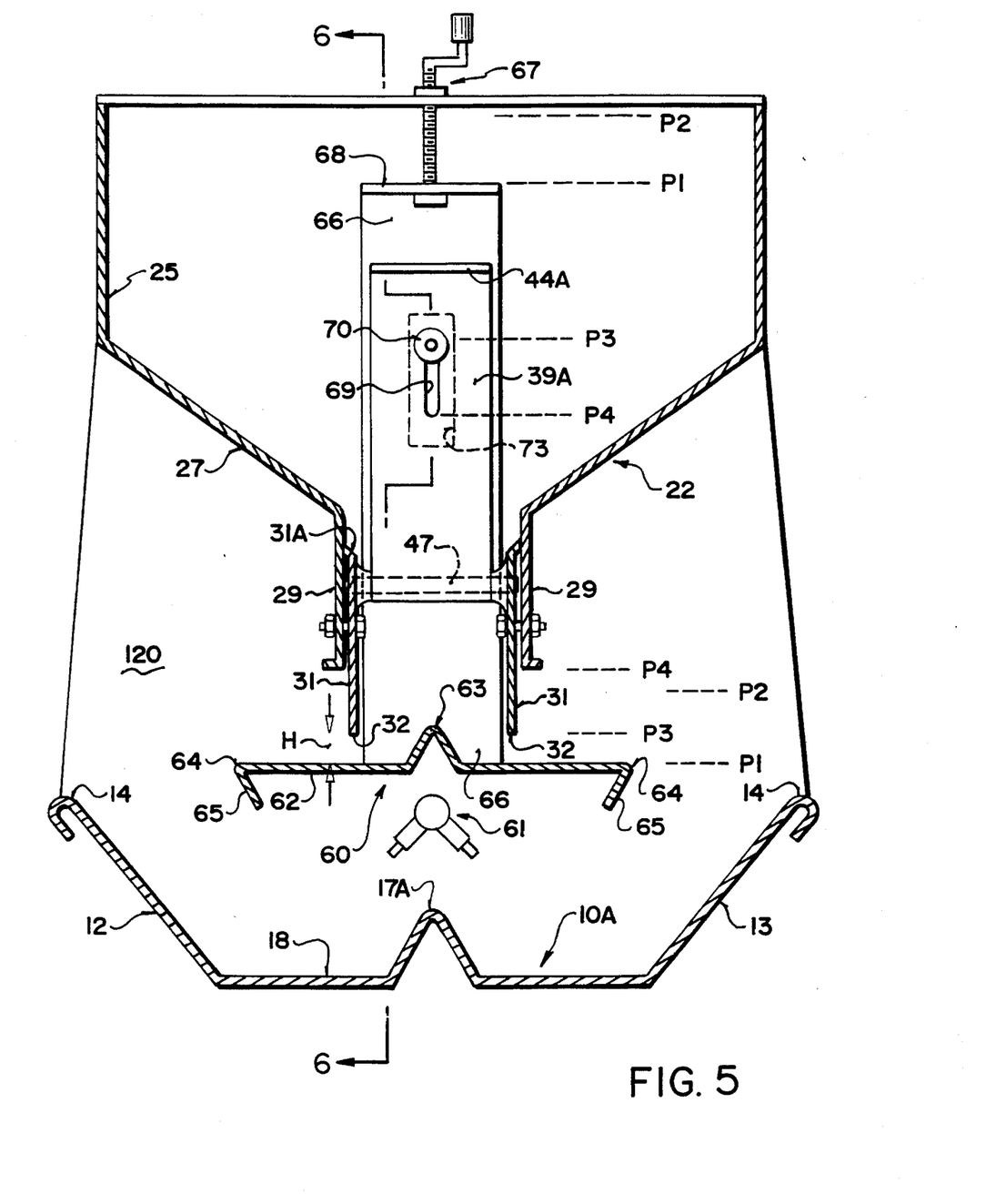
FIG. 5 is a vertical transverse cross sectional view of a first embodiment of feeder according to the present invention showing the adjustable shelf to accommodate animals of increased size after growth.
Figure 6:
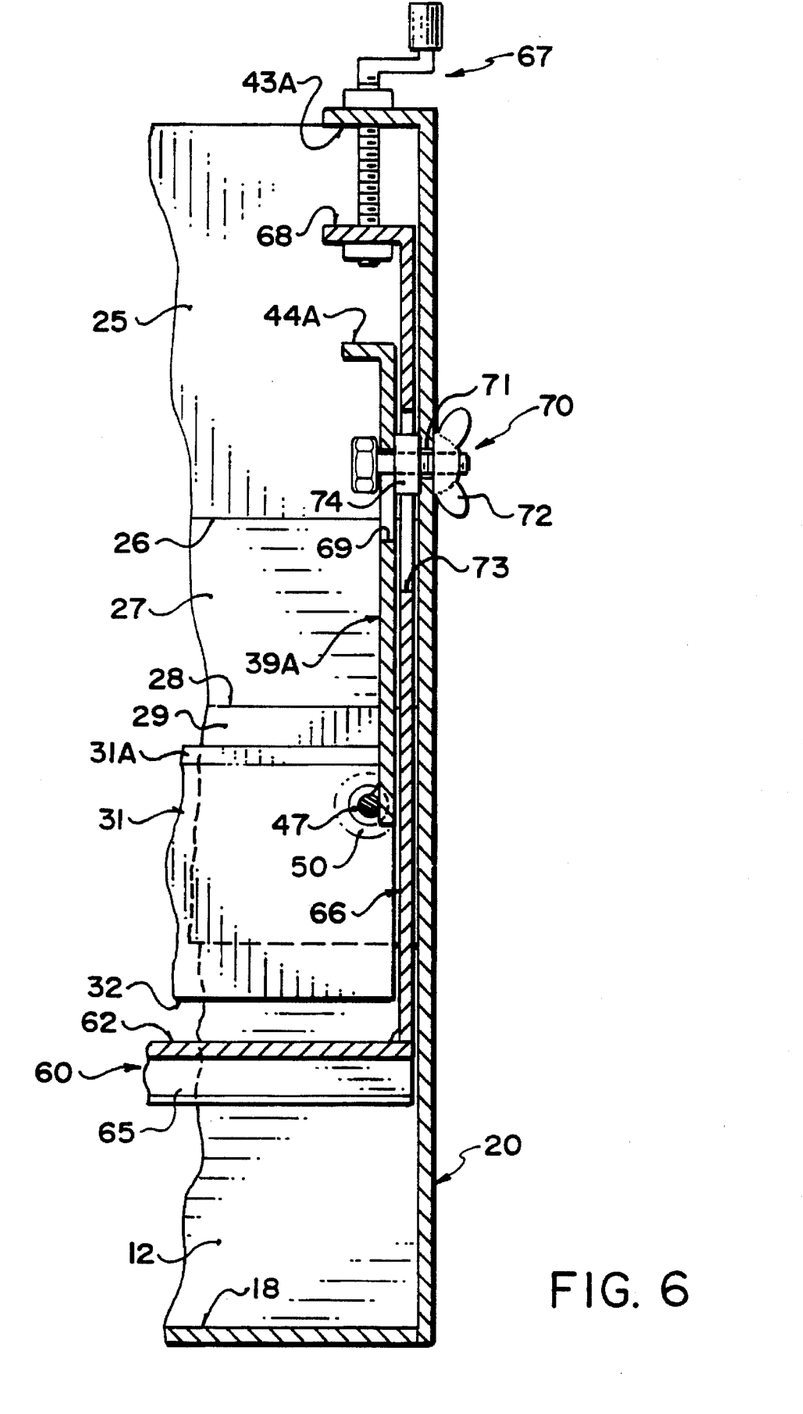
FIG. 6 is a cross-sectional view along the lines 6—6 of FIG. 5.
Figure 7:
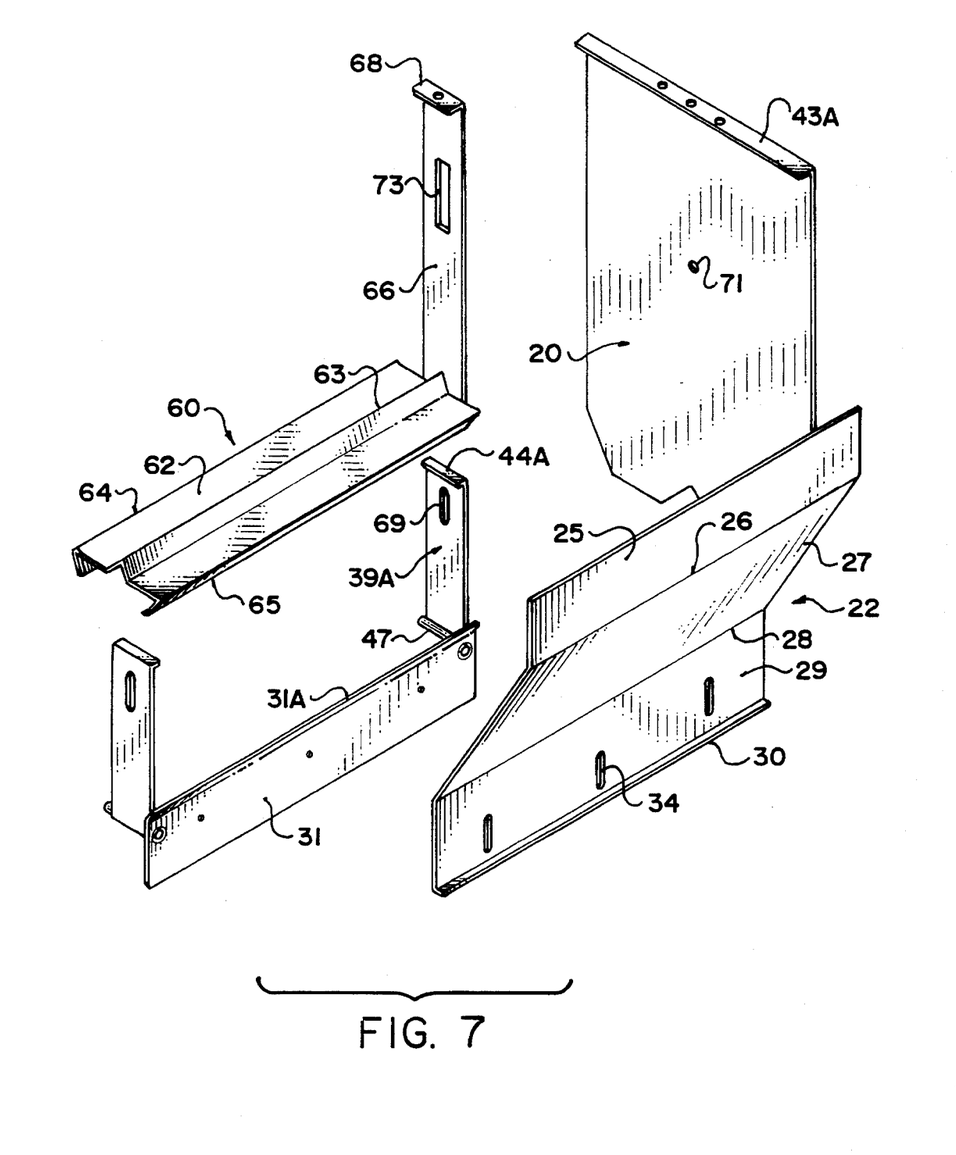
FIG. 7 is an exploded view of the parts of the embodiment of FIG. 5 with the trough and one end wall omitted for convenience of illustration.

Turning now to the embodiment in FIGS. 5 6 and 7, this provides a feeder which is very similar to that of FIG. 1 in that it includes a hopper 22 as previously described and a trough 10A very similar to that of the previous embodiment. The hopper 22 includes the lower portions 29 and the adjustment portions 31 which are mounted and arranged substantially as previously described. The feeder includes the end walls 20 and 21 and the hopper includes the vertical upper walls 25 and the inclined wall 27.

The trough is however modified in that the raised section 15 is omitted and in its place the feeder includes a separate shelf 60 which is spaced upwardly from the base 18 of the trough. The base 18 includes a central rib 17A which acts to divide the trough into two separate sections. An optional water supply system is also shown at 61 which can be used if required so that the feeder is of the wet/dry type or alternatively the water supply can be omitted so that the feeder is wholly of the dry type.

The shelf 60 provides a substantially horizontal surface 62 which is divided into two separate sections by a central raised rib 63 again for dividing the feed on either side of the shelf. The shelf includes two side edges 64 which are spaced outwardly of the lowermost edges 32 of the adjustment portions 31 so as to define a portion of the shelf onto which the feed can fall. The size of the shelf is arranged so that the feed remains basically on the shelf while access by the animal unless the animal moves the feed from the shelf into the trough. At the edges 64, the shelf includes a downturned flange 65 which avoids the raw edge of the shelf being presented to the animal. The shelf is arranged at a height above the front edge 14 of the side wall of the trough so that the animal can reach over the side wall underneath the shelf to the base 18 for accessing feed into that area or can reach over the side wall to the shelf for accessing feed on the shelf.

In order to maintain the feed properly on the shelf to the required amount without the feed discharging from the hopper over the edge 64 of the shelf, it is of course necessary to adjust the height of the lower most edge 32 of the hopper relative to the shelf, the height being indicated at and for this purpose the adjustment portions 31 are provided and are movable by the rod 47 and a strap 39A substantially as previously described.

The shelf 60 is carried at each end on a support strap 66 which is welded to the end of the shelf and stands upwardly therefrom. The strap 66 is arranged immediately adjacent the inside surface of the gable wall 20 and can be moved upwardly and downwardly by a screw jack 67. The screw jack cooperates between an upper flange 68 of the strap 66 and an upper flange 43A of the gable wall 20. The shelf is adjustable thus by the screw providing a fine adjustment between two extreme positions. These extreme positions are indicated at P1, which is the position shown in FIG. 5 and a second raised position indicated at P2. These positions correspond to movement of the flange 68 from the position shown at P1 to the position shown at P2.

The strap 39A which adjusts the height of the adjustment portions 31 is modified relative to the strap 39 of the first embodiment. The modification is that the flange 44A at the top of the strap is not connected to a screw jack but is instead adjustable manually by simply grasping of the flange and pulling or pushing on the flange to move the flange. In the position shown in FIG. 5, the flange 44A and thus the lower most edge 32 is at its lowest position indicated at P3. The flange can be moved vertically upwardly by manual pulling on the flange and the amount of movement is controlled by the ends of a slot 69 provided in the strap 39A. The slot 69 cooperates with a fastener 70 which passes through a hole 71 in the gable wall 20 and cooperates with a wing nut 72 which acts to clamp the strap 39A in fixed position. In order to provide a clamping action without clamping against the strap 66, the strap 66 has an enlarged opening 73 and a washer 74 is provided on the fastener 70 which is of greater thickness than the thickness of the strap 66. In this way the clamping action of the strap 39A occurs by the fastener 70 against the surface of the washer 74 and the strap 66 is free to slide upwardly and downwardly to provide the adjustment between the positions P1 and P2. The ends of the slot 69 thus provide the extreme positions P3 and P4 of the adjustment of the lower most edge 32. The adjustment of the lower most edge 32 is therefore a relatively crude adjustment between two extreme positions. It is also possible to provide additional set positions for example 3 or 4 set positions but in general this is not necessary and two extreme positions are provided to provide the extreme movements of the lower most edges 32., In operation, therefore, the feeder is set up initially for use by smaller animals so that the lowermost edges 32 are moved to the lower extreme position P3. In order to move to this position, of course, the shelf must firstly be moved to or close to its lower position P1. When the lower most edge is at its lowest position P3, and the shelf is at its lowest end position P1, the height H is at a maximum and generally larger than the required spacing for proper control of the feed material. The height H is thus adjusted in fine control by actuation of the screw jack 67 which pulls up the shelf to the required position to provide the required distance H. This distance H can then of course be adjusted if the feed is changed to provide the required control of the feed as it is discharged onto the shelf.

As the animals become larger, the feeder can be converted from the initial position to a raised position in which the feeder is more suitable for the larger animals. In order to achieve this, the strap 39A is adjusted vertically upwardly from the position to the position P4 thus raising the lower most edge 32 to the raised position. This movement of course increase the distance H to a distance significantly greater than that required for proper control of the feed. The shelf is then adjusted by actuating the screw jack 67 to raise the strap 66 thus pulling the shelf upwardly until the height H is moved to the required distance to control the feed.

In both positions of the shelf, the shelf is raised above the top edges 14 of the side walls of the trough so that the animal can feed from the shelf and from the trough in the conventional wet/dry action.

The distance between the extreme positions P3 and P4 is preferably of the order of 3 inches and certainly greater than 2 inches since this provides the required conversion between a feeder suitable for smaller animals and a feeder suitable for larger animals particularly when applied to pigs. Smaller pigs of the order of 15 lb. require the lower height of the shelf and pigs when they reach a size of the order of 110 lb. require higher shelf. The movement between the two of course occurs when the animals reach a suitable stage somewhere between these two weights.

The arrangement of adjustable shelf can be used with a single sided feeder if required.

The course adjustment is as shown provided on the strap 39A and the fine adjustment is provided on the strap 66. It is of course possible to reverse this arrangement so that the course adjustment is effected on the shelf and the fine adjustment is effected on the lowermost edges 32.

Figure 8:
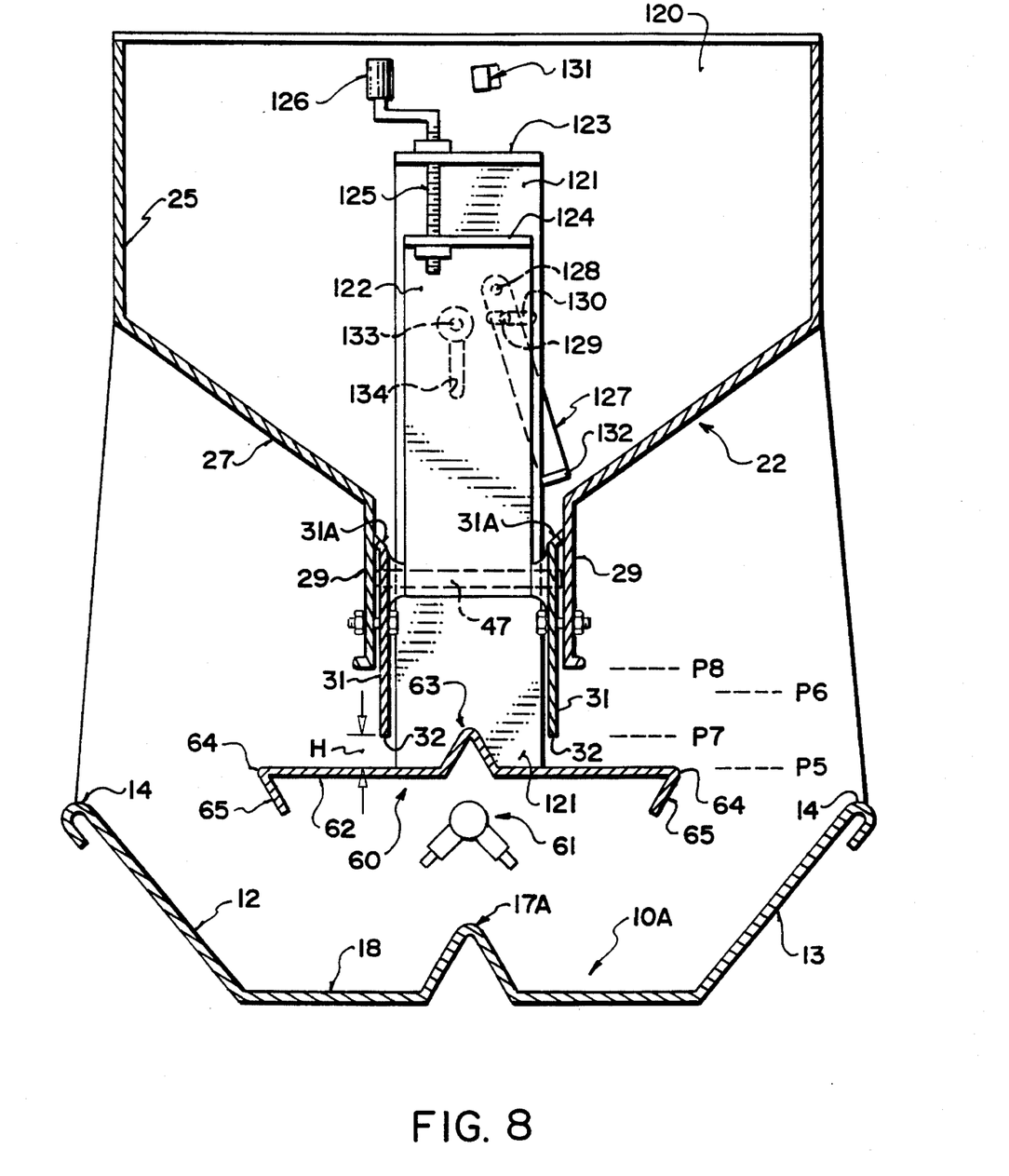
FIG. 8 is a cross-sectional view similar to that of FIG. 5 showing a modified adjustment system for raising and lowering the shelf and adjusting the distance of the lowermost edge of the hopper to the shelf.
Figure 9:
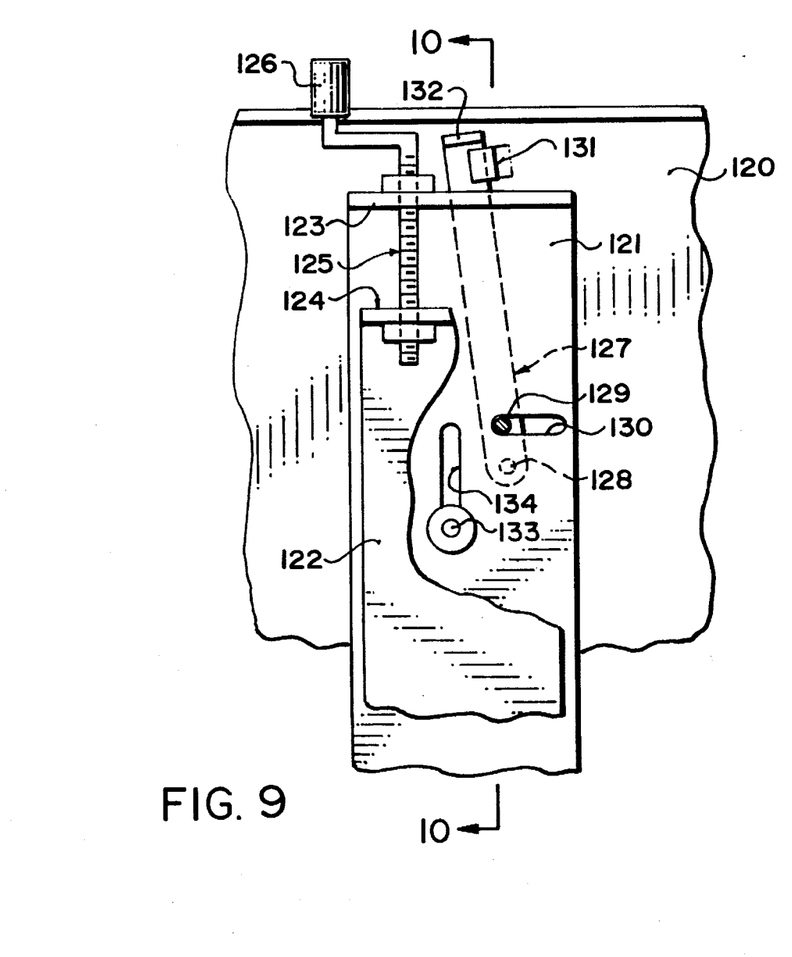
FIG. 9 is a view similar to that of FIG. 8 showing that part only containing the actuating mechanism for effecting adjustment movement of the shelf with a part broken away to show the mechanism behind.
Figure 10:
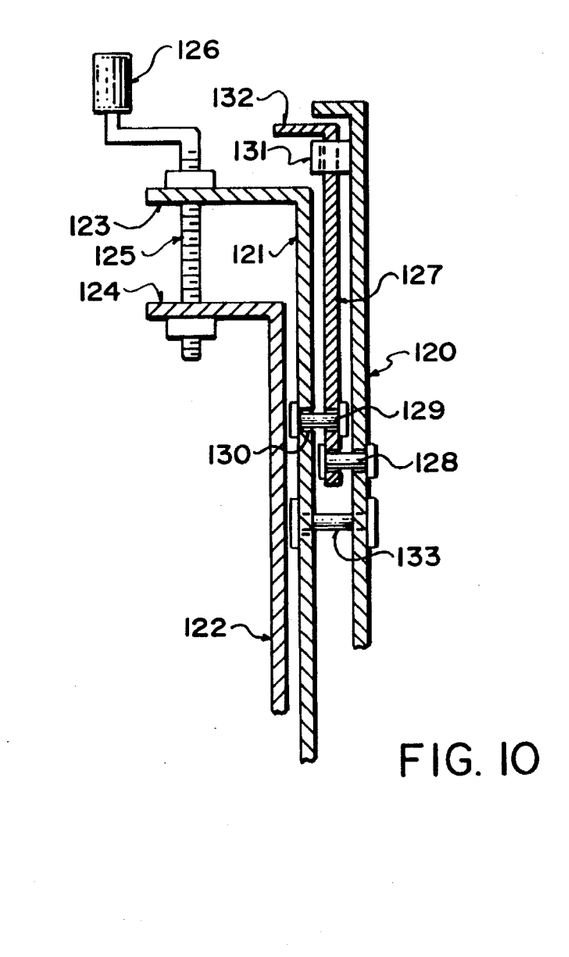
FIG. 10 is a cross-sectional view along the lines 10—10 of FIG. 9 on an enlarged scale.

Turning now to FIGS. 8, 9 and 10 a further arrangement is shown which provides simultaneous course adjustment movement of the shelf and the lowermost edge relative to the gable end of the feeder and subsequently allows fine adjustment between the lowermost edge and the shelf.

The arrangement shown in FIG. 8 is very similar to that shown in FIG. 5 and the modifications only relate to the adjustment between the gable end indicated at 120, the strap 121, which directly supports the shelf, and the strap 122, which supports the lowermost edges 32 by the support mechanism previously described.

In this arrangement the top end of the strap 121 includes an inturned flange 123 and the top end of the strap 122 contains an inturned flange 124. These flanges are interconnected by an adjustment screw 125 operated by a manually actuable handle 126 so that the distance between the flanges 123 and 124 is adjusted by the screw thus adjusting the distance H between the upper surface of the shelf and the lowermost edges 32. The use of the screw provides a fine adjustment allowing close of the distance H for close of the feed of material from the hopper onto the shelf as previously described.

A course movement adjusting the height of the shelf from a lowermost position P5 to an upper position P6 is provided by a lever 127. As this lever simultaneously moves the straps 121 and 122, the lowermost edges 32 move from the position P7 to the position P8. The fine adjustment provided by the screw 125 allows movement of the lowermost edge 32 relative to the shelf from the position P7 or P8 while the shelf remains in the respective position P5 or P6.

The lever 127 is positioned between the strap 121 and the gable end 120. The lever 127 is, at an inner end, mounted on a pivot pin 28 fixed in position on the gable end so that the lever can pivot from a raised position approximately at 12:00 in FIG. 9 in a clockwise direction to a lowered position approximately at 5:00 in FIG. 8. The lever has a manually actuable outer end and carries a pin 129 in fixed position on the lever and spaced from the pivot pin 128 toward the outer end of the lever. The pin 129 extends forwardly from the gable end so as to project through a slot 130 in the strap 121. The slot 130 is approximately horizontal and extends from a position adjacent one vertical edge of the strap to a position partly across the strap. It will be appreciated that, as the lever moves from the raised position to the lowered position, the height of the pin 129 is moved relative to the gable end since the pin 129 is above the pivot pin 128 in FIG. 9 and moves to a position below the pivot pin 128 in FIG. 8. The distance of the pin 129 from the pivot pin 128 is thus equal to approximately one half of the distance between P5 and P6 so that the full extent of movement from the raised position shown in FIG. 9 to the lower position shown in FIG. 8 is equal to the distance between P5 and P6. The slot 130 accommodates the horizontal movement of the pin as it rotates about the pivot pin 128 without causing horizontal movement of the strap 121.

In the raised position, one side edge of the lever 127 is engaged into a notch provided by a punched portion 131 of the gable end. In the lower position a handle 132 which projects forwardly from the lever 127 at the outer end engages a side edge of the strap 121 and prevents further movement in the clockwise direction as shown in FIG. 8.

The movement of the strap 121 is guided in a vertical direction by a pin 133 which is fixed to the gable end 120 and slides in a slot 134 in the strap 121. In the raised position shown in FIG. 9, therefore, the pin 133 is at the bottom of the vertical slot 134 and in the lowered position shown in FIG. 8 the pin 133 is at the top of the vertical slot 134. The slot has a length slightly greater than that required to accommodate the movement generated by the cooperation of the lever and the pins 128 and 129 so that the amount of movement is determined by the spacing between the pins 128 and 129.

As the screw 125 is of fixed length during the course adjustment operated by the lever 127, the straps 121 and 122 move simultaneously in the vertical direction to adjust the shelf from the lower position to the upper position and vice versa while maintaining the height H constant. In this way, the adjustment to accommodate the larger animal can generally be effected in one step without the necessity to readjust the height H which is generally dependent on feed flow quality and thus will likely remain unchanged after the adjustment of the shelf height.

The feeder is therefore designed with two positions of the shelf and with fine adjustment of the distance H to accommodate adjustment for feed flow rate at those two positions on the shelf.

A feeder can therefore be designed with the necessary dimensions to constitute a nursery/grower feeder suitable for hogs starting at the weenling stage at the order of 12 lb. through to the normal upper end of the grower stage which is approximately 100 lb. This relatively large range of animals would normally have difficulty being accommodated on a single feeder since a shelf height suitable for the larger animals approaching the 100 lb. range is effectively inaccessible or is at least of reduced accessibility for the weenling at the 12 lb. level. It is expected therefore, that the feeder would be adjusted from the lower height to the upper height when the animals reach a stage at the order of 50 lb. which is the end of the weenling stage and entry into the grower stage. It has been found that the feeder operates effectively to accommodate the different sizes of animals without the necessity for adjustment of the trough or the position of the water supply 61. The feeder therefore operates effectively through the two stages of the hog growing operation without the necessity for transferring the animals from a first pen to a second pen and the use of feeders of different sizes.

It is expected that the animals will be moved to a further pen at the end of the grower stage where the animals enter the finisher stage and grow from the 100 lb. size up to the finisher size of the order of 220 to 250 lb..

The amount of movement of the shelf to accommodate the different size animals is at least 1.5 inches and preferably of the order of 1.75 to 2.0 inches. This amount of movement can be accommodated in the feeder using a single size of trough and a single width of trough and shelf.

In an alternative system of growing hogs, the hogs are often transferred at the end of the weenling stage of the order of 50 lb. so that they enter a new pen at the grower stage at the 50 lb. weight and then pass through the grower stage to the end of the finisher stage. A separate size of feeder can therefore be generated which is suitable for commencing the animal at the grower stage and then adjusting the height of the shelf at the end of the grower stage to enter the finisher stage. In this arrangement, therefore, the height would be at the lowest position for the animal at the 50 lb. stage entering the grower stage and then would be adjusted at the 100 lb. stage to enter the finisher stage. Again a single feeder can be developed with a single size of trough with fixed front edge, fixed width and fixed height and a fixed water supply with the only adjustment being provided by the height of the shelf as previously described.

It will be appreciated that the common adjustment is effected simultaneously at both ends of the feeder using a similar device at the opposite gable end and that the adjustment device may operate between the gable end and the strap 122 rather than the strap 121 as shown.

Although not shown in FIG. 10, the strap 121 is bent in a line across its width at a position just above the pin 129 so that the upper part of the strap 121 lies as close as possible to the end 120 to prevent feed material from penetrating behind the strap and causing jamming.

The tab 131 is positioned on the side of the lever 127 so as to prevent movement of the lever in the clockwise direction as shown. Thus the adjustment to the raised position the lever 127 passes by the tab 131 before engaging the tab to hold the lever in place.

In an alternative arrangement (not shown), the adjustment of the lever can move through a number of stepped positions from the fully raised position to the fully lowered position. Thus the gable end may be punched to provide engagement members which engage the lever and locate the lever in a plurality of positions providing a plurality of adjustment locations of the shelf and lowermost edge. When the above description therefore refers to adjustment between first and second positions, it will be appreciated that these positions may only be the extreme positions of a plurality of adjustment positions.

Figure 11:
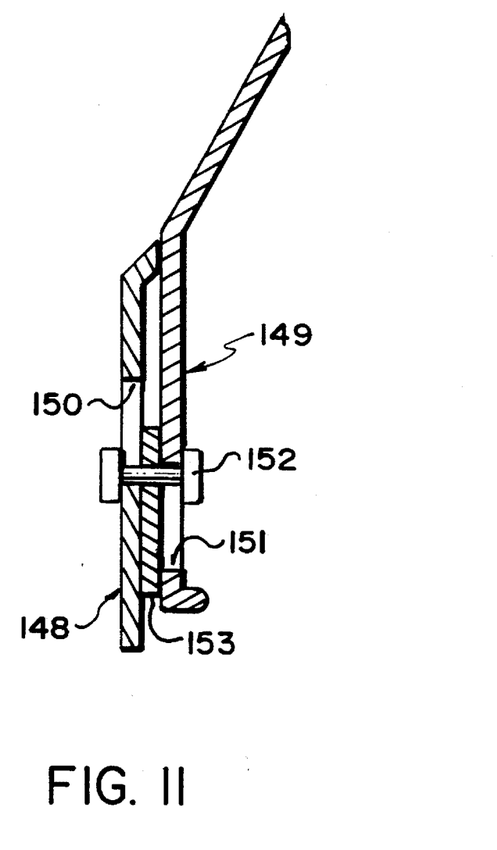
FIG. 11 is a cross-sectional view through one of the adjustment positions showing a modified arrangement for guiding the adjustment portions in a raised position thereof.
Figure 12:
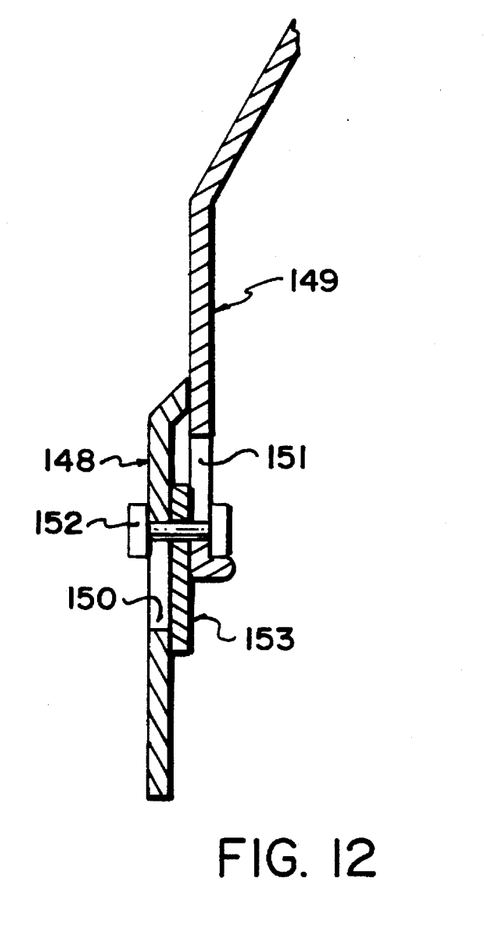
FIG. 12 is the same cross-section as that of FIG. 11 showing a lowered position of the adjustment portion.

Turning now to FIGS. 11 and 12, there is shown a modified arrangement which allows movement of the adjustment portion from the fully raised position to the lowered position using slots in both the adjustment portion and the vertical portion of the hopper to control the movement of the adjustment portion. Thus the adjustment portion 148 includes a slot 150 and the vertical portion 29 also includes a slot 151. A pin 152 passes through both slots. Thus in the raised position of the adjustment portion shown in FIG. 11 the pin is at the bottom of the slot 150 and at the top of the slot 151. In the lowered position shown in FIG. 12 the pin is at the top of the slot 150 and the bottom of the slot 151. In order to prevent the escape of feed material through the slots, a washer or backer plate 153 is mounted on the pin 152 and moves upwardly and downwardly with the pin. This backer plate therefore prevents any possibility of feed material from escaping through the slots from the interior of the hopper outwardly over the shelf into the trough.

The plate 153 can comprise an elongate plate extending across substantially the full width of the adjustment portion and covering a plurality of the guide slots at spaced positions across the adjustment portion. Alternatively the plate 153 can be provided by a plurality of separate washers each engaged on a respective one of the pins of the guide slots. The top edge of the adjustment portion is crimped toward the inside surface of the vertical portion 149 so as to prevent feed material from falling into the space between the adjustment portion and the vertical portion. The height of the plate 153 is such that in the position shown in FIG. 11 it engages over the slot 151. In the position shown in FIG. 12 it engages over the slot 150 and in both cases therefore it prevents the material from escaping through the slots. The plate is positioned between the vertical portion and the adjustment portion so as to be maintained properly in position.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A feeder for feeding animals while the animals grow from a first smaller size to a second larger size comprising:

a trough having a base and a side wall over which the animals can reach for taking feed from the trough;

a shelf mounted above the base of the trough and arranged at a height such that the animals can take feed from the shelf while reaching over the side wall and such that feed falling from the shelf is collected in the trough;

a feed hopper positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal;

and adjustment means including a first adjustment portion for raising and lowering the shelf whereby the height of the shelf from the base of the trough can be adjusted to at least two different heights including a first lower height to accommodate said animals at the first smaller size and including a second higher height to accommodate said animals at the second larger size;

said adjustment means including a second adjustment portion for raising and lowering the lowermost edge;

at least one of the first and second adjustment portions being arranged such that, with the shelf at each of said first lower height and said second higher height, said distance between the lowermost edge and the shelf can be adjusted.

2. The feeder according to claim 1 wherein at least one of said first and second adjustment portions of said adjustment means includes a first course adjustment movable in at least one step between upper and lower extreme positions thereof and at least one of said first and second adjustment portions of said adjustment means includes a second fine adjustment which is used to adjust said distance.

3. The feeder according to claim 2 wherein said adjustment means is arranged such that the second fine adjustment is effected by a screw for fine adjustment of said distance.

4. The feeder according to claim 1 wherein said adjustment means is arranged such that the height of the shelf from the base of the trough can be adjusted by a distance greater than 1.5 inches to accommodate said different sizes of animals.

5. The feeder according to claim 2 wherein both of said first and second adjustment portions of said adjustment means include said first course adjustment for common course adjustment movement of the shelf and the lowermost edge in said adjustment of the height of the shelf and one of said first and second adjustment portions of said adjustment means includes said fine adjustment for adjusting the relative positions between the shelf and the lowermost edge.

6. A feeder for feeding animals while the animals grow from a first smaller size to a second larger size comprising:

a trough having a base and a side wall over which the animals can reach for taking feed from the trough;

a shelf mounted above the base of the trough and arranged at a height such that the animals can take feed from the shelf while reaching over the side wall and such that feed falling from the Shelf iS collected in the trough;

a feed hopper positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal;

and adjustment means comprising:

a first adjustment portion for raising and lowering the shelf comprising a first elongate substantially vertical support attached at a lower end to the shelf;

a second adjustment portion for raising and lowering the lowermost edge comprising a second elongate substantially vertical support attached at a lower end to the lowermost edge;

course adjustment means providing a course adjustment movement of one of the first and second vertical supports relative to the trough for common course adjustment movement of the shelf and the lowermost edge whereby the height of the shelf from the base of the trough can be adjusted in at least one step between positions defining at least two different heights including a first lower height to accommodate said animals at the first smaller size and including a second higher height to accommodate said animals at the second larger size;

and fine adjustment providing a fine adjustment movement between the first and second vertical supports such that, with the shelf at each of said first lower height and said second higher height, said distance between the lowermost edge and the shelf can be finely adjusted.

7. The feeder according to claim 6 wherein the course adjustment means is provided between the first elongate substantially vertical support and an end wall of the feeder.

8. The feeder according to claim 7 wherein the course adjustment means is provided by a lever connected between the first elongate substantially vertical support and an end wall of the feeder.

9. The feeder according to claim 8 wherein the lever moves in a plane parallel to the end wall of the feeder.

10. The feeder according to claim 9 wherein the lever is mounted on a pin for pivotal movement about an axis at right angles to the end wall of the feeder and the lever carries a second pin spaced from the pivot pin and engageable in a slot in the first elongate substantially vertical support for moving the slot and the first elongate substantially vertical support vertically upwardly and downwardly relative to the end wall of the feeder as the lever is moved from a raised position to a lowered position and vice versa.

11. The feeder according to claim 10 including a guide slot and a pin for guiding vertical movement of the first elongate substantially vertical support relative to the end wall of the feeder.

12. A method of feeding animals while the animals grow from a first small size to a second larger size comprising:

providing a trough having a base and a side wall over which the animals can reach for taking feed from the trough;

providing a shelf mounted above the base of the trough and arranged at a height such that the animals can take feed from the shelf while reaching over the side wall and such that feed falling from the shelf is collected in the trough;

providing a feed hopper positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal;

providing first adjustment means for raising and lowering the shelf whereby the height of the shelf from the base of the trough can be adjusted to at least two different heights including a first low height to accommodate said animals at the first small size and including a second higher height to accommodate said animals at the second larger size;

adjusting the height of the shelf to said first low height and at said low height defining said distance to cause said feed to be supplied to the shelf, so as to cause the animals at the first small size eating the feed to grow;

and, when the animals have grown to a predetermined size, adjusting the height of the shelf to the second higher height and at said second higher height defining said distance to cause said feed to be supplied to the shelf.

13. The method according to claim 12 including moving at least one of the shelf and the lowermost edge in a first course adjustment movement in at least one step between upper and lower extreme positions thereof and moving one of the shelf and the lowermost edge relative to the other in a second fine adjustment movement which is used to adjust said distance.

14. The method according to claim 13 wherein the second fine adjustment movement is effected by a screw for fine adjustment of said distance.

15. The method according to claim 12 wherein the height of the shelf from the base of the trough is adjusted between said first low height and said higher second height by a distance greater than 1.5 inches to accommodate said different sizes of animals.

16. The method according to claim 12 wherein the shelf and the lowermost edge are interconnected for a first common adjustment movement of the height of the shelf between the first low height and the second higher height and wherein there is provided an adjustment between the shelf and the lowermost edge for defining said distance at each of the low height and the higher height.

17. The method according to claim 16 wherein the first common adjustment movement is effected between a first element fixed on the feeder and a second element connected to one of the shelf and the lowermost edge.

18. The method according to claim 16 wherein the shelf is raised and lowered by a first generally vertical member at one end of the feeder and wherein the lowermost edge is raised and lowered by a second generally vertical member at said one end of the feeder and wherein the first and second members are interconnected for said common movement relative to said end of the feeder.

19. The method according to claim 12 wherein the shelf is raised and lowered by a first generally vertical member at one end of the feeder and wherein the lowermost edge is raised and lowered by a second generally vertical member at said one end of the feeder and wherein at least one of the first and second members is connected to said end of the feeder for adjustment movement relative thereto.

* * * * *